(12) United States Patent
Na

(10) Patent No.: US 11,625,324 B2
(45) Date of Patent: Apr. 11, 2023

(54) STORAGE DEVICE FOR MOVING VALID DATA TO AN OPEN MEMORY BLOCK BASED ON A VALID PAGE LIST AND OPERATING METHOD THEREOF

(71) Applicant: SK hynix Inc., Icheon (KR)

(72) Inventor: Hyeong Ju Na, Icheon (KR)

(73) Assignee: SK hynix Inc., Icheon (KR)

( * ) Notice: Subject to any disclaimer, the term of this patent is extended or adjusted under 35 U.S.C. 154(b) by 78 days.

(21) Appl. No.: 17/233,252

(22) Filed: Apr. 16, 2021

(65) Prior Publication Data

US 2022/0114089 A1    Apr. 14, 2022

(30) Foreign Application Priority Data

Oct. 13, 2020  (KR) .......................... 10-2020-0132214

(51) Int. Cl.
  *G06F 12/02* (2006.01)
  *G06F 12/0882* (2016.01)
  *G06F 13/16* (2006.01)
  *G06F 12/0891* (2016.01)

(52) U.S. Cl.
  CPC ...... *G06F 12/0246* (2013.01); *G06F 12/0882* (2013.01); *G06F 12/0891* (2013.01); *G06F 13/1673* (2013.01); *G06F 2212/7201* (2013.01)

(58) Field of Classification Search
  CPC ............. G06F 12/0246; G06F 12/0882; G06F 12/0891; G06F 13/1673; G06F 2212/7201; G06F 12/1009; G06F 3/0604; G06F 3/064; G06F 3/0658; G06F 2212/1016; Y02D 10/00; G11C 16/08; G11C 16/14
  See application file for complete search history.

(56) References Cited

U.S. PATENT DOCUMENTS

| | | | | |
|---|---|---|---|---|
| 5,058,003 A | * | 10/1991 | White | G06F 12/1036 711/209 |
| 5,860,146 A | * | 1/1999 | Vishin | G06F 12/1027 711/E12.013 |
| 10,185,658 B2 | | 1/2019 | O'Krafka et al. | |
| 2007/0033378 A1 | * | 2/2007 | Sinclair | G06F 3/0652 711/E12.008 |
| 2011/0191566 A1 | * | 8/2011 | Takamiya | G06F 12/10 711/206 |
| 2017/0083436 A1 | * | 3/2017 | Jung | G06F 12/0246 |
| 2017/0242790 A1 | * | 8/2017 | O'Krafka | G06F 12/0253 |

(Continued)

FOREIGN PATENT DOCUMENTS

KR   10-2020-0044461 A   4/2020

*Primary Examiner* — Tasnima Matin

(57) ABSTRACT

A storage device includes: a memory device including a map data block including mapping information between a logical address and a physical address; a buffer memory device for storing a block state table including block state information; and a memory controller for determining valid data of a source block among the plurality of memory blocks based on mapping information and block state information corresponding to the source block, and moving the valid data to open memory block. The memory controller may generate a valid page list in which information of the valid data is arranged in a stripe page unit according to an order of logical addresses, and control the memory device to move the valid data to the open memory block, based on the valid page list.

18 Claims, 15 Drawing Sheets

(56) References Cited

U.S. PATENT DOCUMENTS

2019/0179747 A1* 6/2019 Kim .................... G06F 12/0253
2021/0349818 A1* 11/2021 Li ........................... G06F 9/544
2022/0058136 A1* 2/2022 Li ....................... G06F 12/0253
2022/0114089 A1* 4/2022 Na ...................... G06F 12/0891

* cited by examiner

| | Seg1 | Seg2 | ... | Seg10 |
|---|---|---|---|---|
| BLK1 | (LBA1~LBA10) | (LBA11~LBA20) | ... | (LBA91~LBA100) |
| BLK2 | (LBA1~LBA10) | (LBA11~LBA20) | ... | (LBA91~LBA100) |
| ⋮ | | | ... | |
| BLKz | (LBA1~LBA10) | (LBA11~LBA20) | ... | (LBA91~LBA100) |

|       | Seg1 | Seg2 | ... | Seg10 |       |
|-------|------|------|-----|-------|-------|
| BLK1  | 1    | 1    | ... | 1     | ~11   |
| BLK2  | 0    | 1    | ... | 0     | ~12   |
| ⋮     |      |      | ... |       |       |
| BLKz  | 0    | 0    | ... | 0     |       |

STORAGE DEVICE FOR MOVING VALID DATA TO AN OPEN MEMORY BLOCK BASED ON A VALID PAGE LIST AND OPERATING METHOD THEREOF

CROSS-REFERENCE TO RELATED APPLICATION

The present application claims priority under 35 U.S.C. § 119(a) to Korean patent application number 10-2020-0132214, filed on Oct. 13, 2020, in the Korean Intellectual Property Office, the entire disclosure of which is incorporated herein by reference.

BACKGROUND

1. Technical Field

The present disclosure generally relates to an electronic device, and more particularly, to a storage device and an operating method thereof.

2. Related Art

A storage device is a device which stores data under the control of a host device such as a computer or a smart phone. The storage device may include a memory device for storing data and a memory controller for controlling the memory device. The memory device is classified into a volatile memory device and a nonvolatile memory device.

The volatile memory device is a memory device in which data is stored only when power is supplied thereto, and stored data disappears when the supply of power is interrupted. The volatile memory device may include a Static Random Access Memory (SRAM), a Dynamic Random Access Memory (DRAM), and the like.

The nonvolatile memory device is a memory device in which data does not disappear even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

SUMMARY

Embodiments provide an operating method of a storage device using a buffer memory having a minimum storage capacity.

In accordance with an aspect of the present disclosure, there is provided a storage device including: a memory device including a plurality of memory blocks and a map data block including mapping information between a logical address and a physical address; a buffer memory device configured to store a block state table including block state information including a map segment to which a logical address of data stored in each of the plurality of memory blocks belongs; and a memory controller configured to determine valid data of a source block among the plurality of memory blocks based on mapping information corresponding to the source block and block state information corresponding to the source block, and move the valid data to open memory block in which no data is stored, wherein the memory controller generates a valid page list in which information of the valid data is arranged in a stripe page unit according to an order of logical addresses, and controls the memory device to move the valid data to the open memory block based on the valid page list, the valid page list being generated using the block state information and the mapping information for the plurality of memory block.

In accordance with another aspect of the present disclosure, there is provided a storage device including: a plurality of memory devices commonly connected to one channel, each of the plurality of memory devices including a plurality of memory blocks and a map data block, the map data block storing mapping information between a logical address and a physical address; a buffer memory device configured to store a block state table including block state information, the block state information including a map segment to which a logical address of data stored in each of the plurality of memory blocks; and a memory controller configured to determine valid data of a source block among the plurality of memory blocks based on mapping information corresponding to the source block and block state information corresponding to the source block, and move the valid data to an open memory block in which no data is stored, wherein the memory controller generates a valid page list in which information of valid data is arranged in a stripe page unit according to an order of logical addresses, and controls the plurality of memory devices to move the valid data to open memory blocks, based on the valid page list, the valid page list being generated using the block state information and the mapping information for the plurality of memory blocks in each of the plurality of memory devices.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 9 is a diagram illustrating a block state table in accordance with an embodiment of the present disclosure.

FIG. 10 is a diagram illustrating a block state table in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

The present disclosure may apply various changes and different shape, therefore only illustrate in details with particular examples. However, the examples do not limit to certain shapes but apply to all the change and equivalent material and replacement. The drawings included are illustrated a fashion where the figures are expanded for the better understanding. In describing the embodiments, description of technologies that are known in the art and are not directly related to the present disclosure is omitted. This is to further clarify the gist of the present disclosure without clutter.

Hereinafter, exemplary embodiments of the present disclosure will be described in detail with reference to the accompanying drawings in order for those skilled in the art to be able to readily implement the technical spirit of the present disclosure.

Figure 1:
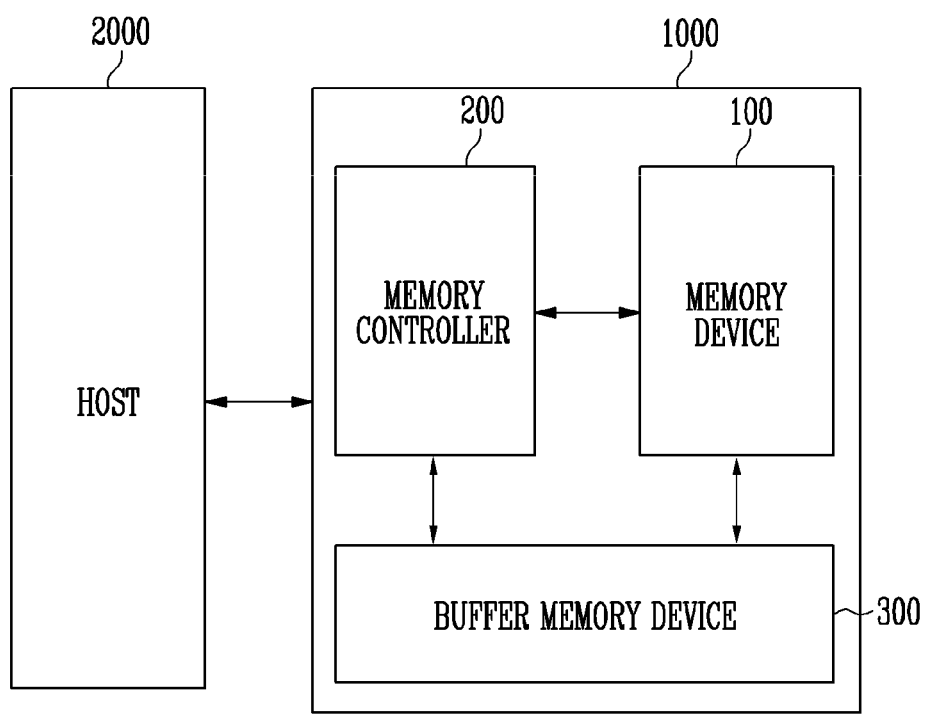
FIG. 1 is a block diagram illustrating a storage device in accordance with an embodiment of the present disclosure.

FIG. 1 is a block diagram illustrating a storage device 1000 in accordance with an embodiment of the present disclosure.

Referring to FIG. 1, the storage device 1000 may include a memory device 100, a memory controller 200, and a buffer memory device 300.

The storage device 1000 may be a device for storing data under the control of a host 2000, such as a mobile phone, a smart phone, an MP3 player, a laptop computer, a desktop computer, a game console, a display device, a tablet PC, an in-vehicle infotainment device, or the like.

The storage device 1000 may be manufactured as any one of various types of storage devices according to a host interface that is a communication scheme with the host 2000. For example, the storage device 1000 may be implemented with any one of a variety of types of storage devices such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 1000 may be implemented as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), a Wafer-level Stack Package (WSP), and the like.

The memory device 100 may store data or use stored data. The memory device 100 operates under the control of the memory controller 200. Also, the memory device 100 may include a plurality of memory dies, and each of the plurality of memory dies may include a memory cell array including a plurality of memory cells for storing data.

Each of the memory cells may be configured as a Single Level Cell (SLC) storing one-bit data, a Multi-Level Cell (MLC) storing two-bit data, a Triple Level Cell (TLC) storing three-bit data, or a Quad Level Cell (QLC) storing four-bit data.

The memory cell array may include a plurality of memory blocks. Each memory block may include a plurality of memory cells, and one memory block may include a plurality of pages. A page may be a unit for storing data in the memory device 100 or reading data stored in the memory device 100.

The memory device 100 may be implemented as a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is assumed and described.

The memory device 100 may receive a command and an address from the memory controller 200. The memory device 100 may access an area, selected by the received address, in the memory cell array. The memory device 100 performs an operation corresponding to the received command on the selected area. For example, the memory device 100 may perform a write operation (or program operation), a read operation, and an erase operation. The program operation may be an operation in which the memory device 100 records data in the area selected by the address. The read operation may be an operation in which the memory device 100 reads data from the area selected by the address. The erase operation may be an operation in which the memory device 100 erases data stored in the area selected by the address.

The memory controller 200 may control overall operations of the storage device 1000.

When power is applied to the storage device 1000, the memory controller 200 may execute firmware (FW). The FW may include a Host Interface Layer (HIL) which receives a request input from the host 2000 or outputs a response to the host 2000, a Flash Translation Layer (FTL) which manages an operation between an interface of the host 2000 and an interface of the memory device 100, and a Flash Interface Layer (FIL) which provides a command to the memory device 100 or receives a response from the memory device 100.

The memory controller 200 may receive data and a Logical Address (LA) from the host 2000, and translate the LA into a Physical Address (PA) representing an address of memory cells of the memory device 100 in which the data is to be stored. The LA may be a Logical Block Address (LBA), and the PA may be a Physical Block Address (PBA).

The memory controller 200 may control the memory device 100 to perform a program operation, a read operation, an erase operation, or the like in response to a request from the host 2000. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

The memory controller 200 may control the memory device 100 to autonomously perform a program operation, a read operation, or an erase operation regardless of any request from the host 2000. For example, the memory controller 200 may control the memory device 100 to perform a program operation, a read operation, or an erase operation, which is used to perform a background operation such as wear leveling, garbage collection, or read reclaim.

The host 2000 may communicate with the storage device 1000 using at least one of various communication schemes such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), a Load Reduced DIMM (LRDIMM), and the like.

Figure 2:
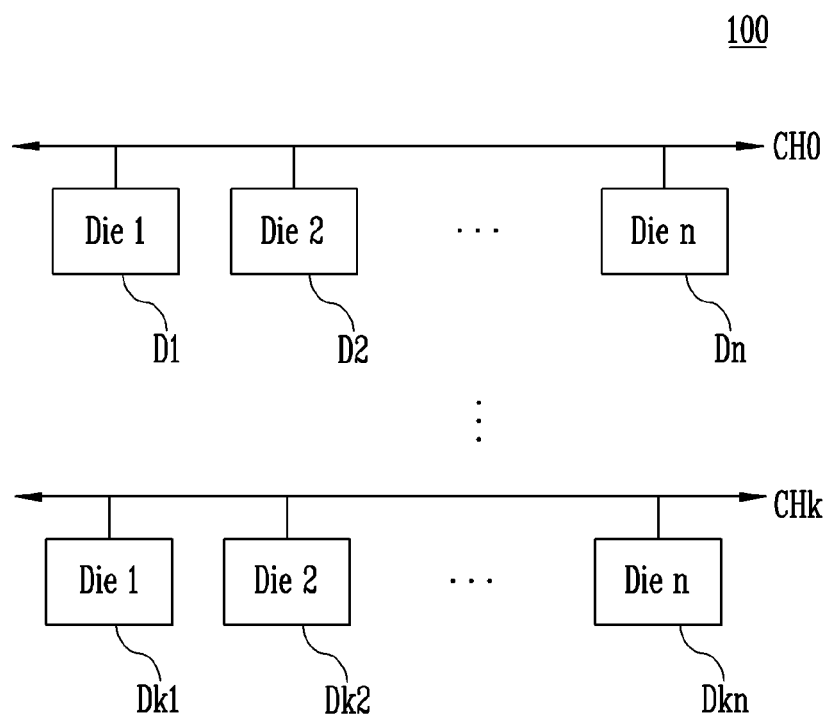
FIG. 2 is a block diagram illustrating a memory device in accordance with an embodiment of the present disclosure.

FIG. 2 is a block diagram illustrating a memory device 100 in accordance with an embodiment of the present disclosure. The memory device 100 of FIG. 2 may correspond to the memory device 100 of FIG. 1.

Referring to FIG. 2, the memory device 100 may include a plurality of channels CH0 to CHk and a plurality of dies D1 to DKn connected to the plurality of channels CH0 to CHk. In addition, the memory controller 200 of FIG. 1 may be connected to the memory device 100 by using the plurality of channels CH0 to CHk. Specifically, the memory controller 200 may be connected to the plurality of channels CH0 to CHk, and be connected to a plurality of dies D1 to Dn connected to a zeroth channel CH0. That is, the memory controller 200 may communicate with the plurality of dies D1 to Dn by using the zeroth channel CH0 among the plurality of channels CH0 to CHk.

The memory controller 200 may control the plurality of dies D1 to Dn to operate independently from one another. For example, a first die D1 connected to the zeroth channel CH0 and a first die Dk1 connected to a kth channel CHk have circuits or structures for performing internal operations, and therefore, the memory controller 200 may control the memory device 100 such that the first die D1 connected to the zeroth channel CH0 and the first die Dk1 connected to the kth channel CHk operate independently from each other. Also, the memory controller 200 may allow a plurality of dies connected to the same channel to operate simultaneously. For example, the memory controller 200 allows the plurality of dies D1 to Dn connected to the zeroth channel CH0 to operate simultaneously, and allows the plurality of dies Dk1 to Dkn connected to the kth channel CHk to operate simultaneously.

Figure 3:
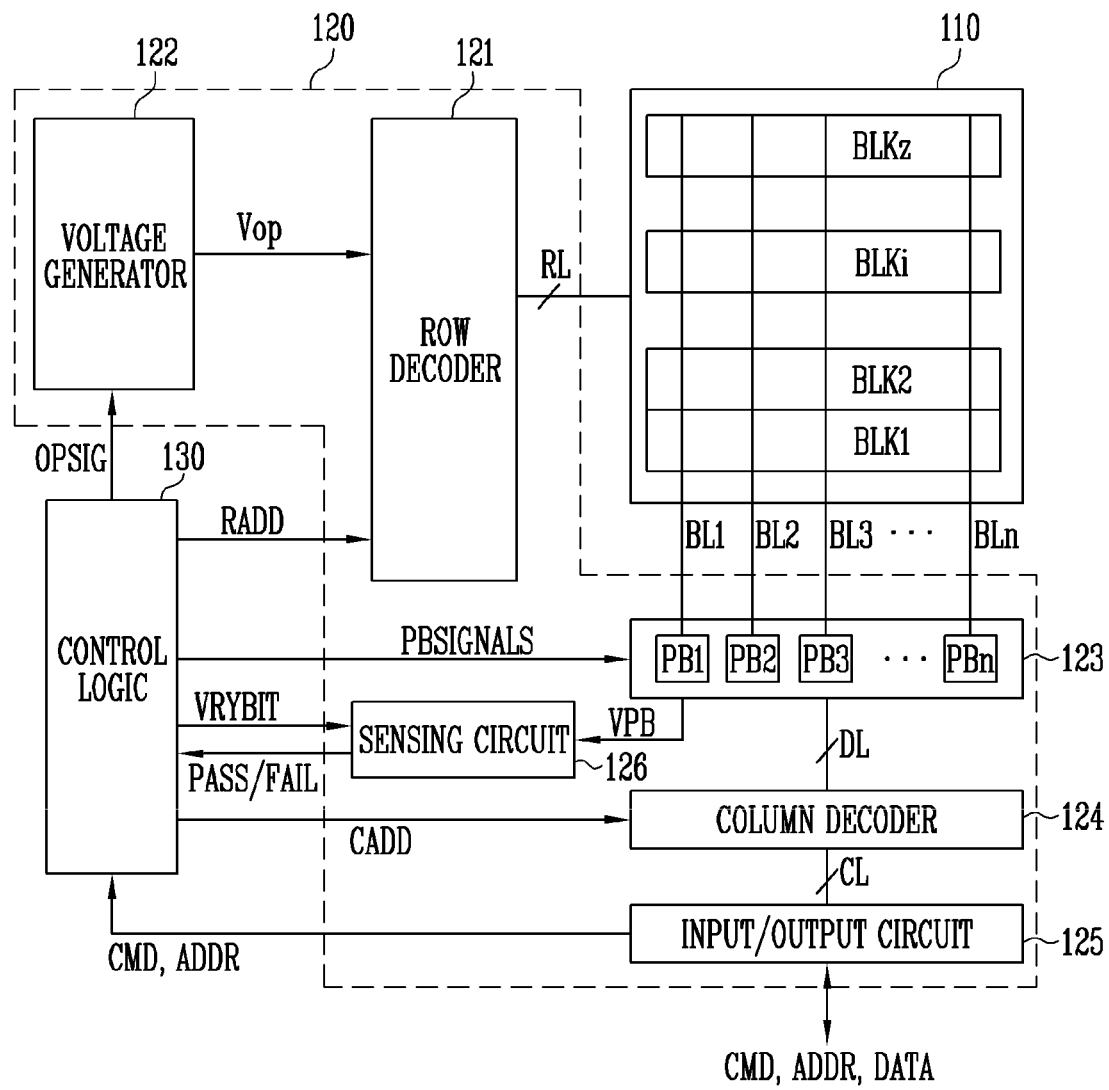
FIG. 3 is a diagram illustrating a die in accordance with an embodiment of the present disclosure.

FIG. 3 is a diagram illustrating a die in accordance with an embodiment of the present disclosure. The plurality of dies D1 to Dkn shown in FIG. 2 may be configured identically to one another, and therefore, the first die D1 connected to the zeroth channel CH0 among the plurality of dies D1 to Dkn will be described as an example with reference to FIG. 3.

Referring to FIG. 3, the first die D1 may include a memory cell array 110, a peripheral circuit 120, and a control logic 130.

The memory cell array 110 includes a plurality of memory blocks BLK1 to BLKz. The plurality of memory blocks BLK1 to BLKz are connected to a row decoder 121 through row lines RL. The row lines RL may include at least one source select line, a plurality of word lines, and at least one drain select line. The plurality of memory blocks BLK1 to BLKz are connected to a page buffer group 123 through bit lines BL1 to BLn. Each of the plurality of memory blocks BLK1 to BLKz includes a plurality of memory cells. In an embodiment, the plurality of memory cells may be nonvolatile memory cells. Memory cells connected to the same word line may be defined as one page. Therefore, one memory block may include a plurality of pages.

Each of the memory cells included in the memory cell array 110 may be configured as a Single Level Cell (SLC) storing one-bit data, a Multi-Level Cell (MLC) storing two-bit data, a Triple Level Cell (TLC) storing three-bit data, or a Quadruple Level Cell (QLC) storing four-bit data.

The peripheral circuit 120 may be configured to perform a program operation, a read operation, or an erase operation on a selected area of the memory cell array 110 under the control of the control logic 130. That is, the peripheral circuit 120 may drive the memory cell array 110 under the control of the control logic 130. For example, the peripheral circuit 120 may apply various operating voltages to the row lines RL and the bit lines BL1 to BLn or discharge the applied voltages under the control of the control logic 130.

Specifically, the peripheral circuit 120 may include the row decoder 121, a voltage generator 122, the page buffer group 123, a column decoder 124, an input/output circuit 125, and a sensing circuit 126.

The row decoder 121 may be connected to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 may operate under the control of the control logic 130. The row decoder 121 may receive a row address RADD from the control logic 130. Specifically, the row decoder 121 may decode the row address RADD. The row decoder 121 may select at least one memory block among the memory blocks BLK1 to BLKz according to the decoded address. Also, the row decoder 121 may select at least one word line of the selected memory block according to the decoded address to apply voltages generated by the voltage generator 122 to the at least one word line WL.

For example, in a program operation, the row decoder 121 may apply a program voltage to the selected word line, and apply a program pass voltage having a level lower than that of the program voltage to unselected word lines. In a program verify operation, the row decoder 121 may apply a verify voltage to the selected word line, and apply a verify pass voltage higher than the verify voltage to the unselected word lines. In a read operation, the row decoder 121 may apply a read voltage to the selected word line, and apply a read pass voltage higher than the read voltage to the unselected word lines.

In an embodiment, an erase operation of the memory device 100 may be performed in a memory block unit. In the erase operation, the row decoder 121 may select one memory block according to the decoded address. In the erase operation, the row decoder 121 may apply a ground voltage to word lines connected to the selected memory block.

The voltage generator 122 may operate under the control of the control logic 130. Specifically, the voltage generator 122 may generate a plurality of voltages by using an external power voltage supplied to the memory device 100 under the control of the control logic 130. For example, the voltage generator 122 may generate a program voltage, a verify voltage, a pass voltage, a read voltage, an erase voltage, and the like under the control of the control logic 130. That is, the voltage generator 122 may generate various operating voltages Vop used in program, read, and erase operations in response to an operation signal OPSIG from the control logic 130.

In an embodiment, the voltage generator 122 may generate an internal power voltage by regulating the external power voltage. The internal power voltage generated by the voltage generator 122 may be used as an operation voltage of the memory cell array 110.

In an embodiment, the voltage generator 122 may generate the plurality of voltages by using the external power voltage or the internal power voltage. For example, the voltage generator 122 may include a plurality of pumping capacitors for receiving the internal power voltage, and generate the plurality of voltages by selectively activating the plurality of pumping capacitors under the control of the control logic 130. In addition, the plurality of voltages may be supplied to the memory cell array 110 by the row decoder 121.

The page buffer group 123 may include first to nth page buffers PB1 to PBn. The first to nth page buffers PB1 to PBn may be connected to the memory cell array 110 respectively through the first to nth bit lines BL1 to BLn. Also, the first to nth page buffers PB1 to PBn may operate under the control of the control logic 130. Specifically, the first to nth page buffers PB1 to PBn may operate in response to page buffer control signals PBSIGNALS. For example, the first to nth page buffers PB1 to PBn may temporarily store data received through the first to nth bit lines BL1 to BLn, or sense a voltage or current of the bit lines BL1 to BLn in a read operation or a program verify operation.

Specifically, in a program operation, the first to nth page buffers PB1 to PBn may transfer data DATA received through the input/output circuit 125 to selected memory cells through the first to nth bit lines BL1 to BLn, when a program voltage is applied to a selected word line. Memory cells of a selected page, which are connected to the selected word line, may be programmed according to the transferred data DATA. A memory cell connected to a bit line to which a program allow voltage (e.g., a ground voltage) is applied may have an increased threshold voltage. A threshold voltage of a memory cell connected to a bit line to which a program inhibit voltage (e.g., a power voltage) is applied may be maintained without being changed.

In a program verify operation, the first to nth page buffers PB1 to PBn may read data from the memory cells of the selected page through the first to nth bit lines BL1 to BLn.

In a read operation, the first to nth page buffers PB1 to PBn may read data DATA from the memory cells of the selected page through the first to nth bit lines BL1 to BLn, and outputs the read data DATA to the input/output circuit 125 under the control of the column decoder 124.

In an erase operation, the first to nth page buffers PB1 to PBn may float the first to nth bit lines BL1 to BLn.

The column decoder 124 may communicate data between the input/output circuit 125 and the page buffer group 123 in response to a column address CADD. For example, the column decoder 124 may communicate data with the first to nth page buffers PB1 to PBn through data lines DL, or communicate data with the input/output circuit 125 through column lines CL.

The input/output circuit 125 may transfer a command CMD and an address ADDR, which are received from the memory controller 200, to the control logic 130, or exchange data DATA with the column decoder 124.

In a read operation or a program verify operation, the sensing circuit 126 may generate a reference current in response to an allow bit signal VRYBIT, and output a pass signal PASS or a fail signal FAIL by comparing a sensing voltage VPB received from the page buffer group 123 and a reference voltage generated by the reference current.

The control logic 130 may control the peripheral circuit 120 by outputting the operation signal OPSIG, the row address RADD, the page buffer control signals PBSIGNALS, the allow bit signal VRYBIT, and the column address CADD in response to the command CMD and the address ADDR.

Also, the control logic 130 may determine whether the program verify operation has passed or failed in response to the pass or fail signal PASS or FAIL. Also, the control logic 130 may control the page buffer group 123 to temporarily store verify information including the pass or fail signal PASS or FAIL in the page buffer group 123. Specifically, the control logic 130 may determine a program state of a memory cell in response to the pass or fail signal PASS or FAIL. For example, when the memory cell operates as a Triple Level Cell (TLC), the control logic 130 may determine whether the program state of the memory cell is any one of an erase state and first to seventh program states.

Figure 4:
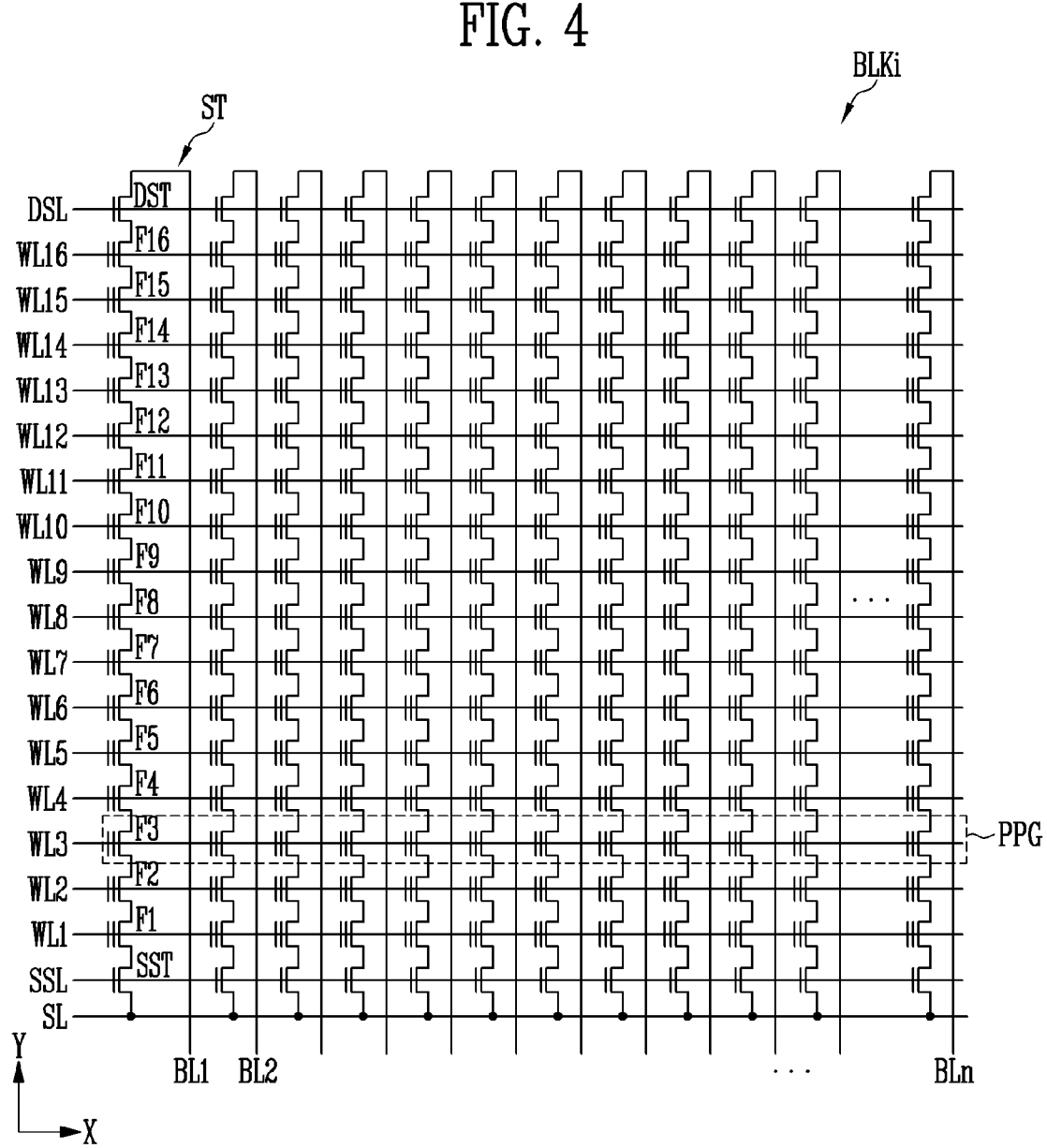
FIG. 4 is a diagram illustrating a memory block in accordance with an embodiment of the present disclosure.

FIG. 4 is a diagram illustrating a memory block BLKi in accordance with an embodiment of the present disclosure.

Referring to FIG. 4, in the memory block BLKi, a plurality of word lines arranged in parallel to each other may be connected between a first select line and a second select line. The first select line may be a source select line SSL, and the second select line may be a drain select line DSL. More specifically, the memory block BLKi may include a plurality of strings ST connected between bit lines BL1 to BLn and a source line SL. The bit lines BL1 to BLn may be respectively connected to the strings ST, and the source line SL may be commonly connected to the strings ST. The strings ST may be configured identically to one another, and therefore, a string ST connected to the first bit line BL1 will be described in detail as an example.

The string ST may include a source select transistor SST, a plurality of memory cells F1 to F16, and a drain select transistor DST, which are connected in series to each other between the source line SL and the first bit line BL1. In other embodiments, at least one source select transistor SST and at least one drain select transistor DST may be included in one string ST, and memory cells of which number is greater than that of the memory cells F1 to F16 shown in FIG. 4 may be included in the one string ST.

A source of the source select transistor SST may be connected to the source line SL, and a drain of the drain select transistor DST may be connected to the first bit line BL1. The memory cells F1 to F16 may be connected in series between the source select transistor SST and the drain select transistor DST. Gates of source select transistors SST included in different strings ST may be connected to the source select line SSL, and gates of drain select transistors DST included in different strings ST may be connected to the drain select line DSL. Gates of the memory cells F1 to F16 may be connected to a plurality of word lines WL1 to WL16, respectively. A group of memory cells connected to the same word line among memory cells included in different strings ST may be referred to as a physical page PPG. Therefore, physical pages PPG corresponding to the number of the word lines WL1 to WL16 may be included in the memory block BLKi.

Each of the memory cells F1 to F16 may be configured as a Single Level Cell (SLC), a Multi-Level Cell (MLC), a Triple Level Cell (TLC), or a Quad Level Cell (QLC).

The SLC may store one-bit data. One physical page PG of the SLC may store one logical page (LPG) data. The one LPG data may include data bits of which number corresponds to that of cells included in the one physical page PG.

The MLC, the TLC, and the QLC may store two or more-bit data. One physical page PG may store two or more LPG data.

Figure 5:
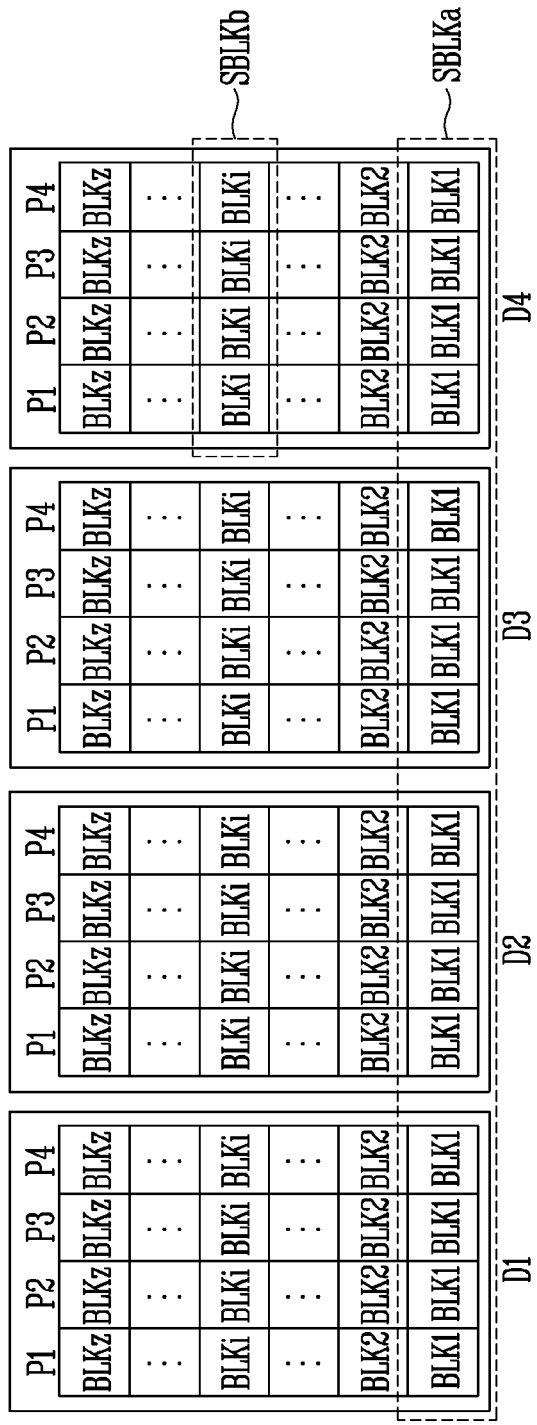
FIG. 5 is a diagram illustrating a super block in accordance with an embodiment of the present disclosure.

FIG. 5 is a diagram illustrating a super block of a memory device 100 in accordance with an embodiment of the present disclosure. The memory device 100 of FIG. 5 may correspond to the memory block 100 shown in FIG. 2.

Referring to FIG. 5, the memory device 100 may include a first die D1 to a fourth die D4, and each of the dies D1 to D4 may include a plurality of planes P1 to P4 each including a plurality of memory blocks BLK1 to BLKz. Meanwhile, although FIG. 5 shows a case where the memory device 100 includes the four dies D1 to D4 and each of the dies D1 to D4 includes the four planes P1 to P4, this is merely an embodiment, and it will be apparent that the memory device 100 may include more or less dies or planes than the dies or the planes shown in FIG. 5.

The plurality of memory blocks BLK1 to BLKz included in the dies D1 to D4 may be grouped as a plurality of super blocks SBLK. A super block SBLK may be a set of memory blocks BLK on which a read operation, a write operation, or the like is performed simultaneously or in the same time slot, or a set of memory blocks BLK to which a read operation, a write operation, or the like is performed in connection or relation in the memory device 100. Alternatively, the super block SBLK may be a set of memory blocks BLK on which a read operation, a write operation, or the like is performed in response to one command, or a set of memory blocks BLK on or to which a read operation, a write operation, or the like is performed simultaneously or in connection in the memory device 100. In addition, a group of memory blocks BLK distinguished from each other from the viewpoint of an operation among a plurality of memory blocks BLK may be referred to as a super block SBLK.

In accordance with an embodiment of the present disclosure, sizes of super blocks SBLK in the memory device 100 may be different from each other. For example, numbers of memory blocks BLK included in the super blocks SBLK may be different from each other. In addition, a plurality of memory blocks included in a super block SBLK may be located in one die. Alternatively, two or more memory blocks BLK included in a super block SBLK may be located in two or more different dies.

For example, the memory device 100 in accordance with the embodiment of the present disclosure may include super blocks SBLK having different sizes. Specifically, referring to FIG. 5, a first super block SBLKa may include memory blocks included in the first die D1 to the fourth die D4, and a second super block SBLKb may include memory blocks included in only the fourth die D4. The first super block SBLKa and the second super block SBLKb may have different sizes from each other, and have different numbers of memory blocks from each other.

In addition, each of a plurality of memory blocks included in a super block SBLK may include a plurality of pages PG. The plurality of pages PG may constitute a plurality of page rows according to a row order. One page row may be configured with one or more pages.

Figure 6:
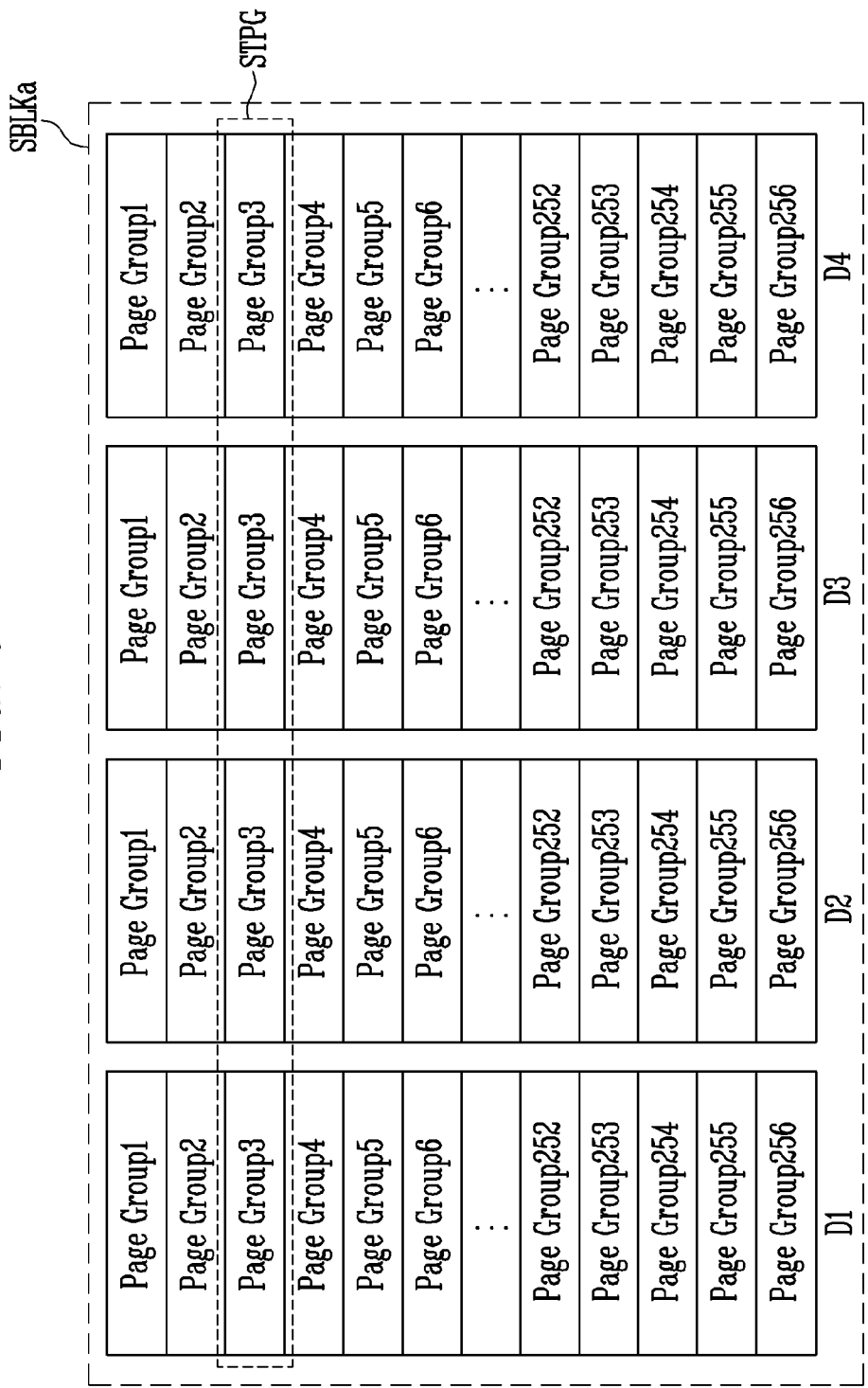
FIG. 6 is a diagram illustrating a stripe page in accordance with an embodiment of the present disclosure.

FIG. 6 is a diagram illustrating a stripe page in accordance with an embodiment of the present disclosure. FIG. 6 illustrates the first super block SBLKa of FIG. 5. Referring to FIG. 6, the first super block SBLKa may include a plurality of page groups included in the first die D1 to the fourth die D4. A page group may include a set of pages belonging to the same page row in one die. For example, a first page group may include pages belonging to a first page row in each die. In addition, a plurality of page groups, which are included in a plurality of dies and belong to the same page row, may constitute a stripe page STPG. That is, the stripe page STPG may include several page groups, each of which is a set of pages PG belonging to the same page row, throughout the plurality of dies. For example, in FIG. 6, the stripe page STPG may include four page groups, each of which is a set of pages PG belonging to the same page row, throughout the first die D1 to the fourth die D4. Referring to FIGS. 5 and 6, a page group may be disposed according to a row order of a plurality of pages included in the four planes P1 to P4 included in each of the first die D1 to the fourth die D4.

In addition, a number of page rows included in the stripe page STPG may be changed depending on a data storage method (e.g., SLC, MLC, TLC, or the like). In accordance with an embodiment, in the case of a TLC, the stripe page STPG may include three page rows.

Figure 7:
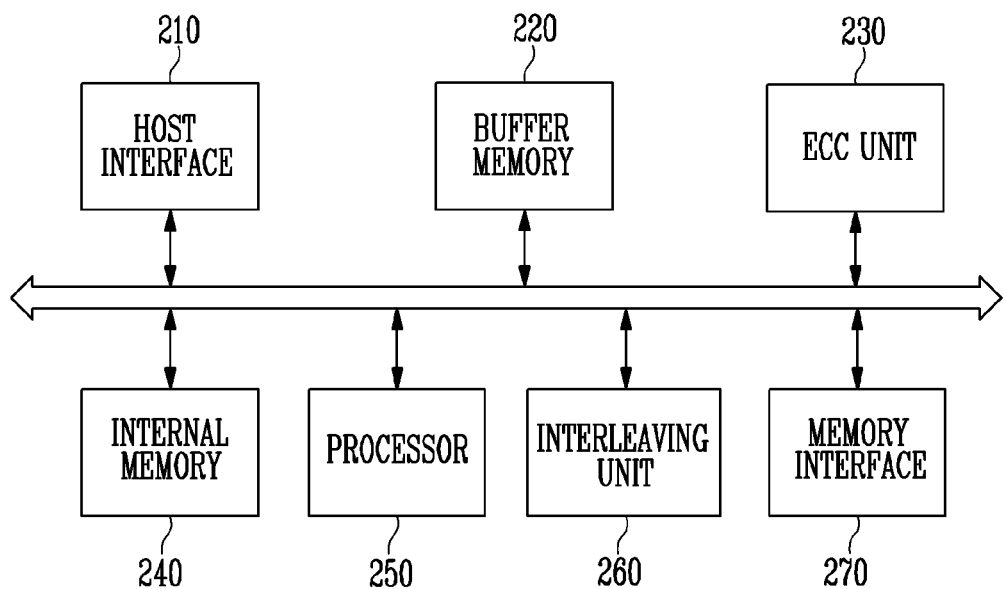
FIG. 7 is a block diagram illustrating a memory controller in accordance with an embodiment of the present disclosure.

FIG. 7 is a block diagram illustrating a memory controller 200 in accordance with an embodiment of the present disclosure. The memory controller 200 of FIG. 7 may correspond to the memory controller 200 shown in FIG. 1.

Referring to FIG. 7, the memory controller 200 may include a host interface 210, a buffer memory 220, an Error Correction Code (ECC) unit 230, an internal memory 240, a processor 250, an interleaving unit 260, and a memory interface 270.

The host interface 210 may include a protocol for exchanging data between the host 2000 and the memory controller 200. Specifically, the host interface 210 may communicate with the host 2000 using at least one of various interface protocols such as a Universal Serial Bus (USB) protocol, a Multi-Media Card (MMC) protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer System Interface (SCSI) protocol, an Enhanced Small Disk Interface (ESDI) protocol, an Integrated Drive Electronics (IDE) protocol, and a private protocol.

The buffer memory 220 may be used as a working memory or a cache memory of the processor 250. Also, the buffer memory 220 may store codes and commands, which the processor 250 executes. The buffer memory 220 may store data processed by the processor 250. Also, the buffer memory 220 may include a Static RAM (SRAM) or a Dynamic RAM (DRAM).

The ECC unit 230 may detect an error in a program operation or a read operation, and correct the detected error. Specifically, the ECC unit 230 may perform an error correction operation according to an ECC. Also, the ECC unit 230 may perform ECC encoding on data to be written to the memory device 100. The data on which the ECC encoding is performed may be transferred to the memory device 100 through the memory interface 270. Also, the ECC unit 230 may perform ECC decoding on data received from the memory device 100 through the memory interface 270.

The internal memory 240 may be used as a storage unit for storing various information necessary for an operation of the memory controller 200. Specifically, the internal memory 240 may include a map table, and physical-to-logical address information and logical-to-physical address information may be stored in the map table. Also, the internal memory 240 may be controlled by the processor 250.

The processor 250 may communicate with the host 2000 by using the host interface 210, and perform a logical operation to control an operation of the memory controller 200. For example, the processor 250 may load a program command, a data file, a data structure, etc., based on a request received from the host 2000 or an external device, and perform various operations or generate a command and an address. For example, the processor 250 may generate various commands necessary for a program operation, a read operation, an erase operation, a suspend operation, and a parameter setting operation.

Also, the processor 250 may perform a function of a Flash Translation Layer (FTL). The processor 250 may translate a Logical Block Address (LBA) provided by the host 2000 into a Physical Block Address (PBA) through the FTL. The FTL may receive an LBA and translate the LBA into a PBA using the map table. There are several address mapping methods of the FTL according to mapping units. A representative address mapping method includes a page mapping method, a block mapping method, and a hybrid mapping method.

Also, the processor 250 may generate a command without any request from the host 2000. For example, the processor 250 may generate a command for background operations such as operations for wear leveling of the memory device 100 and operations for garbage collection of the memory device 100.

The interleaving unit 260 may detect an operation which each of memory units included in the memory device 100 performs. The operation may be any one of a program operation, a read operation, and an erase operation. Specifically, the interleaving unit 260 may receive, from the memory device 100, information on the progress or end of an operation performed by the memory device 100 through the memory interface 270, and detect the operation performed by the memory device 100 based on the received information. Specifically, the interleaving unit 260 may receive, from an individual operation controller, information on a read operation being performed or information on a plane on which the read operation is to be performed.

The memory interface 270 may communicate with the memory device 100 by using a communication protocol under the control of the processor 250. Specifically, the memory interface 270 may communicate a command, an address, and data with the memory device 100 through a channel. For example, the memory interface 270 may include a NAND interface when the memory device 100 is a NAND flash memory.

Figure 8:
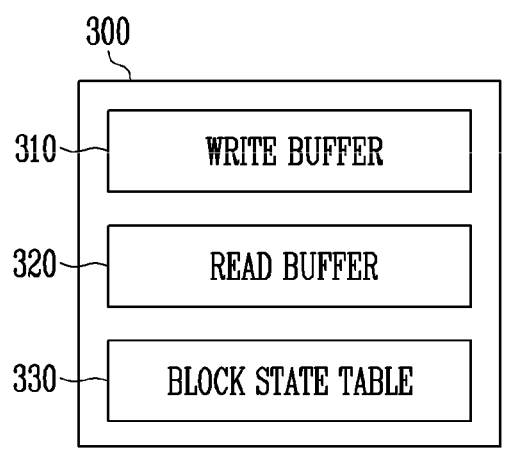
FIG. 8 is a block diagram illustrating a buffer memory device in accordance with an embodiment of the present disclosure.

FIG. 8 is a block diagram illustrating a buffer memory device 300 in accordance with an embodiment of the present disclosure. The buffer memory device 300 of FIG. 8 may correspond to the buffer memory device 300 shown in FIG. 1.

Referring to FIG. 8, the buffer memory device 300 may include a write buffer 310, a read buffer 320, and a block state table 330.

The write buffer 310 may temporarily store data to be written to the memory device 100 of FIG. 1. Specifically, the write buffer 310 may temporarily store the data to be written to the memory device 100 among data received from the host 2000 or the memory device 100. Also, the write buffer 310 may transmit the temporarily stored data to the memory device 100 under the control of the memory controller 200 of FIG. 1.

The read buffer 320 may temporarily store data read from the memory device 100. Specifically, the read buffer 320 may temporarily store the data read from the memory device 100 under the control of the memory controller 200. Also, the read buffer 320 may transmit the temporarily stored data to the write buffer 310 or the host 2000 under the control of the memory controller 200.

Meanwhile, the buffer memory device 300 may include the block state table 330. The block state table 330 will be described in detail with reference to FIGS. 9 and 10.

FIG. 9 is a diagram illustrating a block state table 330 in accordance with an embodiment of the present disclosure. The block state table 330 of FIG. 9 may correspond to the block state table 330 shown in FIG. 8.

Referring to FIG. 9, the block state table 330 may include a plurality of map segments for each memory block. In this specification, for convenience of description, it is assumed that 10 map segments may correspond to one memory block. Specifically, a first memory block BLK1 may correspond to a first map segment Seg1 to a tenth map segment Seg10. A second memory block BLK2 may correspond to the first map segment Seg1 to the tenth map segment Seg10.

In addition, one map segment may include a plurality of map entries each corresponding to a logical address. In this specification, for convenience of description, it is assumed that one map segment may include 10 map entries. Specifically, the first map segment Seg1 may include 10 map entries respectively corresponding to a first logical block address LBA1 to a tenth logical block address LBA10. That is, one map entry may correspond to one logical block address LBA.

Figure 10:
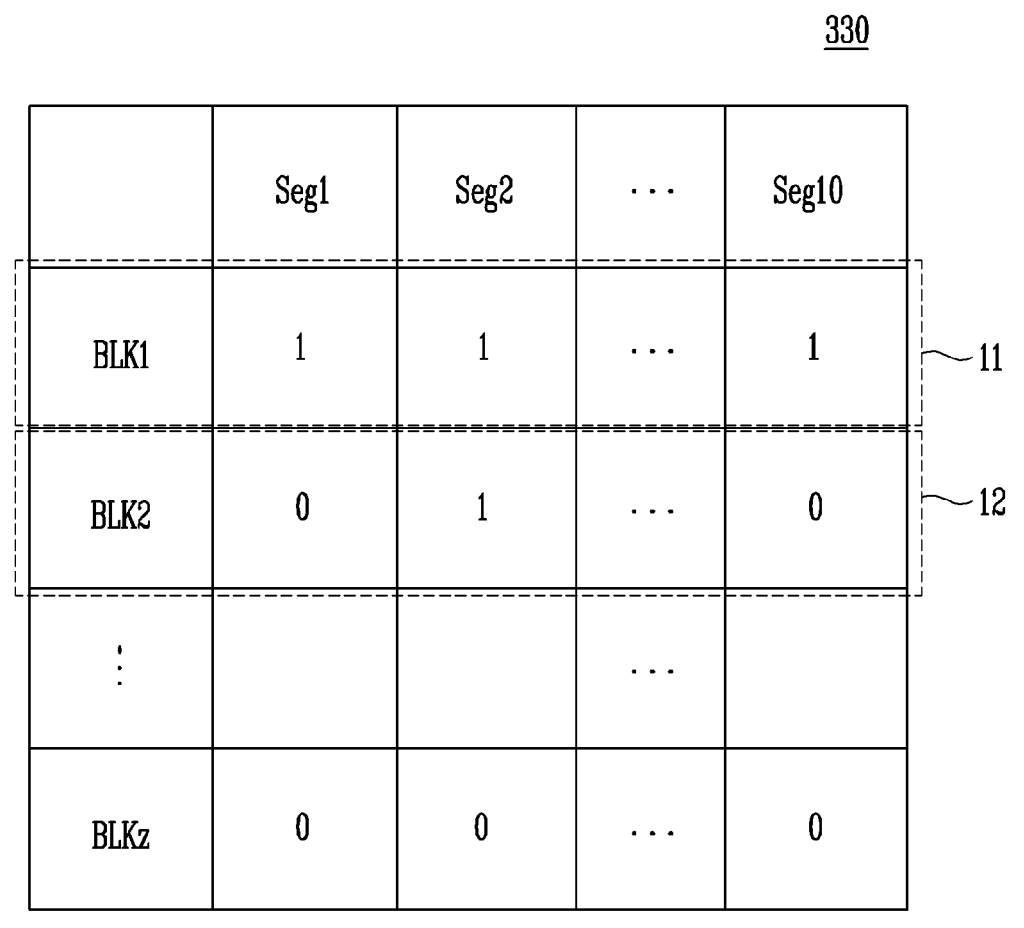

FIG. 10 is a diagram illustrating a block state table 330 in accordance with an embodiment of the present disclosure. The block state table 330 of FIG. 10 may correspond to the block state table 330 shown in FIG. 8.

Referring to FIG. 10, the block state table 330 may represent a map segment to which a logical address of data stored in each memory block belongs. Specifically, the block state table 330 may include a plurality of map segments, and one bit may be allocated to each map segment. Also, the block state table 330 may represent whether data is stored in a corresponding memory block, by using a map segment for the corresponding memory block.

For example, in FIG. 10, referring to a first area 11 of the block state table 330 that corresponds to a first memory block BLK1, a first map segment Seg1 to a tenth map segment Seg10 have a set state '1.' A set state '1' may represent that data is stored in a portion of a memory block that corresponds to a logic address of a map segment.

As described in FIG. 9, the first map segment Seg1 may correspond to the first logical block address LBA1 to the tenth logical block address LBA10. In addition, a map segment may represent information to which a logical address of stored data belongs. Specifically, referring to the first map segment Seg1 to the tenth map segment Seg10 of the first memory block BLK1 shown in FIG. 9, it can be seen that at least one data corresponding to the first logical block address LBA1 to the tenth logical block address LBA10, at least one data corresponding to an eleventh logical block address LAB11 to a twentieth logical block address LBA20, . . . , and at least one data corresponding to a ninety-first logical block address LAB91 to a hundredth logical block address LBA100 are included in the first memory block BLK1.

Meanwhile, in accordance with an embodiment of the present disclosure, the memory controller 200 may select a memory block, which has a high probability that an invalid page exists therein, from among a plurality of memory blocks with reference to the block state table 330.

Specifically, referring to the first area 11 of the block state table 330, which corresponds to the first memory block BLK1, and a second area 12 of the block state table 330, which corresponds to a second memory block BLK2, all of the first map segment Seg1, the second map segment Seg2, and the tenth map segment Seg10 in the first area 11 may have the set state '1.' In the second area 12, the second map segment Seg2 may have the set state '1,' and at least the first map segment Seg1 and the tenth map segment Seg10 may have a clear state '0.' A clear state '0' may represent that no data is stored in a portion of a memory block that corresponds to a map segment.

Referring to the block state table 330 shown in FIG. 10, it can be seen that a larger amount of data is stored in the first memory block BLK1 as compared with the second memory block BLK2. In addition, since a larger amount of data is stored in the first memory block BLK1 as compared with the second memory block BLK2, the first memory block BLK1 may be a block having a high probability that an invalid page exists therein, as compared with the second memory block BLK2.

Figure 11:
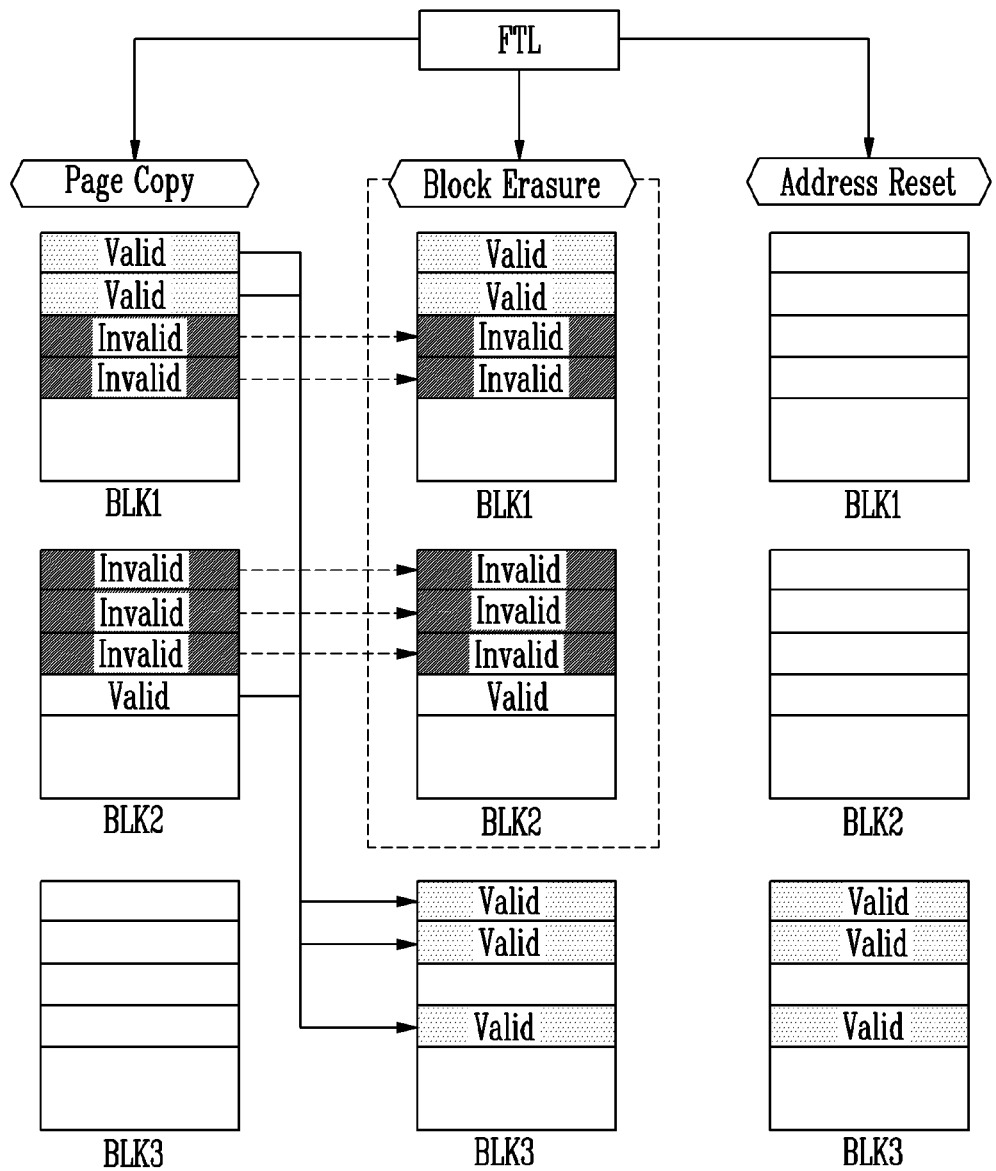
FIG. 11 is a diagram illustrating garbage collection (CG) in accordance with an embodiment of the present disclosure.

FIG. 11 is a diagram illustrating garbage collection (CG) in accordance with an embodiment of the present disclosure. The garbage collection shown in FIG. 11 will be described with reference to FIG. 1.

Referring to FIG. 11, the memory controller 200 may detect a page state (e.g., a valid page state, an invalid page state, or the like) of each of a plurality of pages PG included in each of a plurality of memory blocks BLK in the memory device 100 with reference to a valid page table VPT.

The valid page table VPT may include page state information (information representing whether a corresponding page is a valid page or an invalid page) for each of the plurality of pages PG, such that the memory controller 200 can detect whether each of the plurality of pages PG is a valid page or an invalid page with reference to the valid page table VPT.

For example, the memory controller 200 may detect a valid page VPG and an invalid page IVPG, which are distinguished from each other, among the plurality of pages PG included in each of the plurality of memory blocks BLK in the memory device 100, based on the page state information included in the valid page table VPT.

Referring to FIG. 11, a first memory block BLK1 may be determined to include two valid pages VPG and two invalid pages IVPG as a result obtained by checking page states of a plurality of pages PG included in the first memory block BLK1 based on the valid page table VPT. In the same way, a second memory block BLK2 may be determined to include one valid page VPG and three invalid pages IVPG. In addition, a third memory block BLK3 may be determined to be an open block or a good block, in which any data is not stored yet.

The memory controller 200 may control the memory device 100 to move the two valid pages VPG in the first memory block BLK1 to the third memory block BLK3 that is the open block, and control the memory device 100 to move the one valid page VPG in the second memory block BLK2 to the third memory block BLK3. Accordingly, the third memory block BLK3 may include three valid pages VPG without any invalid page.

Subsequently, the memory controller 200 may perform block erasure processing (Block Erasure) on the first memory block BLK1 including the two invalid page IVPG corresponding to third and fourth pages PG3 and PG4 and the second memory block BLK2 including the three invalid pages IVPG corresponding to first to third pages PG1, PG2, and PG3.

Also, the memory controller 200 may perform address reset processing (Address Reset) for resetting addresses of the three valid pages VPG moved to the third memory block BLK3. Accordingly, the memory controller 200 can perform address mapping on the three valid pages VPG moved to the third memory block BLK3.

The garbage collection described above may be performed by, e.g., the processor 250 shown in FIG. 7, and the Flash Translation Layer (FTL) may perform the garbage collection in terms of a functional layer.

Figure 12:
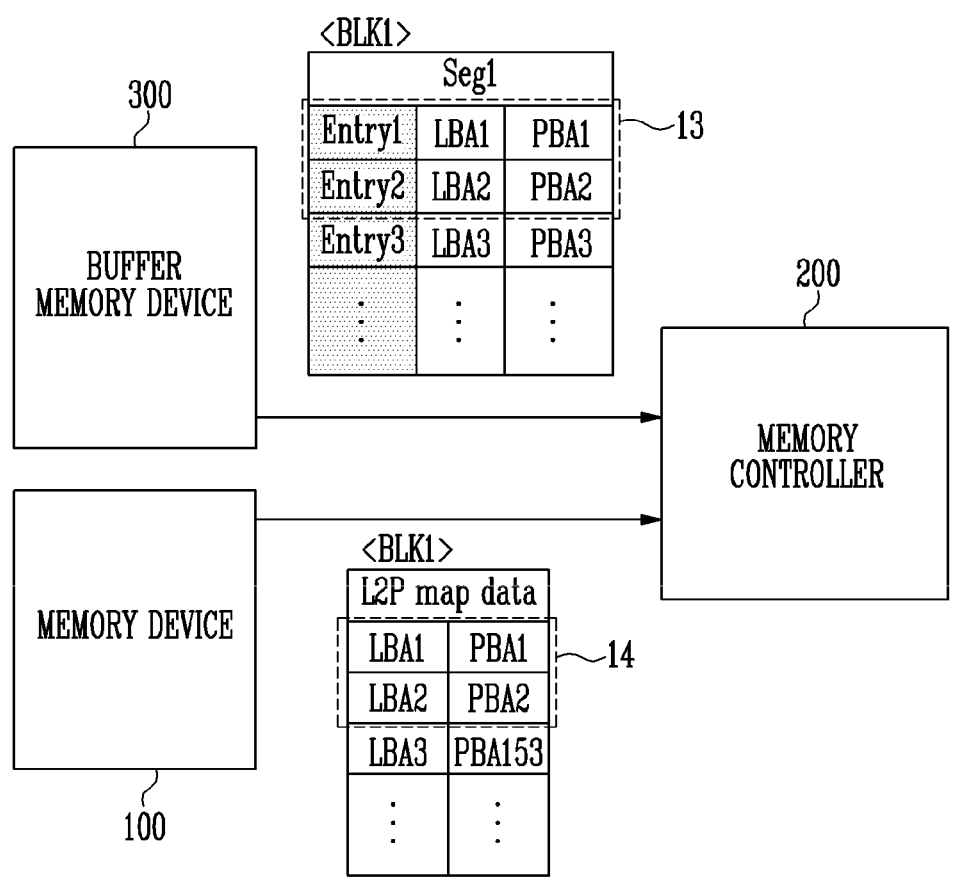
FIG. 12 is a diagram illustrating a method for acquiring valid page information in accordance with an embodiment of the present disclosure.

FIG. 12 is a diagram illustrating a method for acquiring valid page information in accordance with an embodiment of the present disclosure. The method of FIG. 12 will be described with reference to figures described above.

Referring to FIG. 12, the memory controller 200 may receive block state information from the buffer memory device 300, and receive mapping information from the memory device 100. Also, the memory controller 200 may generate a valid page table VPT by using the block state information and the mapping information.

Specifically, the buffer memory device 300 may store the block state table 330. The block state table 330 may include a map segment to which a logical address of data stored in each memory block belongs. The block state table 330 may include the block state information as information on logical addresses of data stored in each of memory blocks. The memory controller 200 may receive block state information on a specific memory block from the buffer memory device 300.

The memory device 100 may include a map data block including the mapping information representing a relationship between a logical address and a physical address. The memory controller 200 may further receive, from the memory device 100, mapping information corresponding to the block state information on the specific memory block.

The memory controller 200 may detect valid data of the specific memory block by using the block state information and the mapping information for the specific memory block. For example, it is assumed that the specific memory block is a first memory block BLK1. When comparing block state information of a first map segment Seg1 of the first memory block BLK1, which is received from the buffer memory device 300, with mapping information of the first memory block BLK1, address information 13 of a first entry and a second entry in the first map segment Seg1 and information 14 of map data are determined to be the same as shown in FIG. 12, and thus the memory controller 200 can check that data corresponding to LBA1 and LBA2 are valid data.

In an embodiment, the buffer memory device 300 includes information on the number of valid pages included in each of memory blocks in the memory device 100. In the garbage collection, the memory controller 200 determines a source block among the memory blocks based on the information on the number of the valid pages. The source block on which the garbage collection is to be performed is a memory block having a smallest number of valid pages among the memory blocks.

Figure 13:
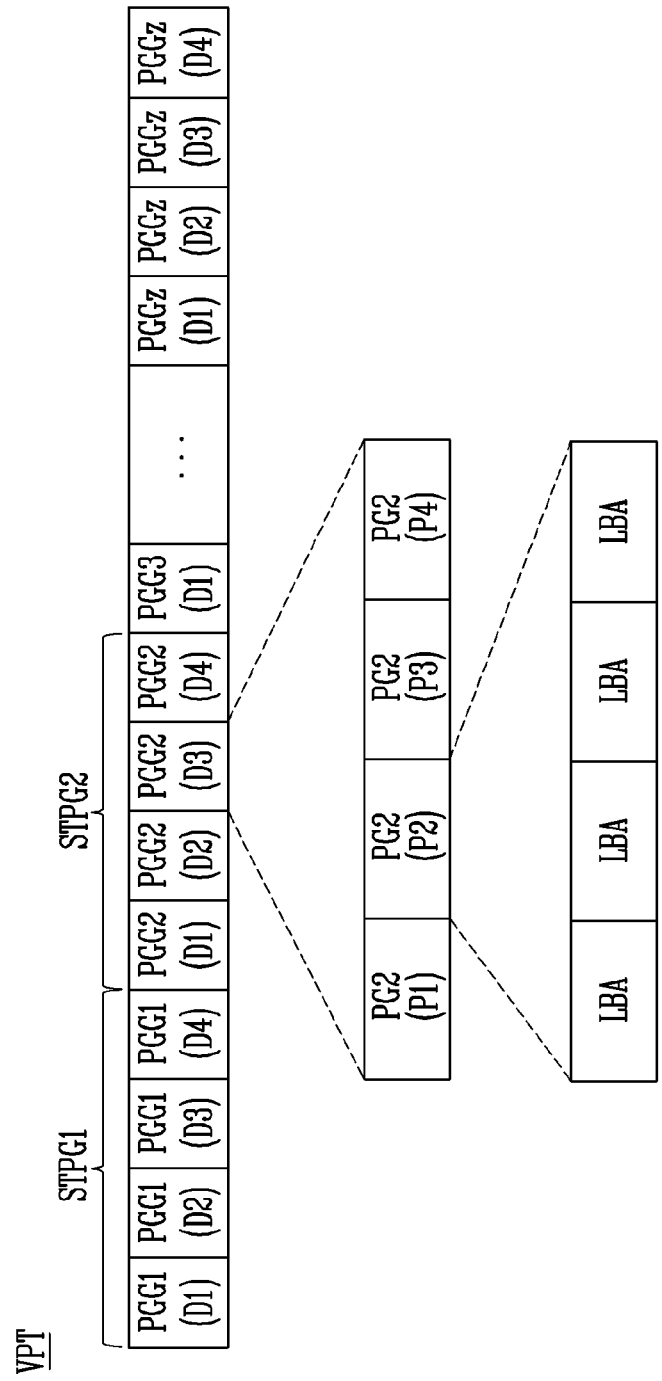
FIG. 13 is a diagram illustrating a valid page table in accordance with an embodiment of the present disclosure.

FIG. 13 is a diagram illustrating a valid page table VPT in accordance with an embodiment of the present disclosure. In FIG. 13, it is assumed that the memory device 100 of FIG. 1 includes four dies D1 to D4, each of the four dies D1 to D4 includes four planes P1 to P4, and one page includes four LBAs.

Referring to FIG. 13, the valid page table VPT may be generated by the memory controller 200 in a stripe page (STPG) unit. In addition, the valid page table VPT may include valid page information of pages PG or page state information.

For example, the valid page table VPT may include valid page information of pages PG included in a first stripe page STPG1, valid page information of pages PG included in a second stripe page STPG2, and the like.

One stripe page STPG may include pages belonging to the same page row included in each of a plurality of dies. Specifically, since one stripe page STPG includes four page groups PGG corresponding to four dies D1 to D4, and each page group PGG includes four pages PG corresponding to four planes P1 to P4, the one stripe page STPG may include a total of 16 pages. Also, since one page includes four logical block addresses, the one strip page STPG may include a total of 64 logical block addresses.

For example, referring to FIG. 13, the second stripe page STPG2 may include a page group PGG2(D1) of the first die D1, a page group PGG2(D2) of the second die D2, a page group PGG2(D3) of the third die D3, and a page group PGG2(D4) of the fourth die D4. In addition, the page group PGG2(D3) of the third die D3 may include a page PG2(P1) of the first plane P1, a page PG2(P2) of the second plane P2, a page PG2(P3) of the third plane P3, and a page PG2(P4) of the fourth plane P4. Each of the pages PG2(P1) to PG2(P4) may include 4 logical block addresses (LBAs). Accordingly, the second strip page STPG2 may include a total of 64 logical block addresses.

The memory controller 200 may generate the valid page table VPT including information of valid pages in a stripe page (STPG) unit according to an order of logical addresses. The memory controller 200 may move valid pages to open memory blocks with reference to the valid page table VPT.

In accordance with an embodiment of the present disclosure, the memory controller 200 may generate the valid page table VPT including information of valid pages in the stripe page unit, and move valid pages with reference to the valid page table VPT. The memory controller 200 stores a list of valid pages, i.e., a valid page list, in the valid page table VPT, and therefore, the buffer memory device 300 may not be required to buffer all valid data corresponding to the valid pages. In addition, when the storage device 1000 reads data corresponding to consecutive logical addresses, a high speed can be ensured by using an interleaving operation.

Figure 14:
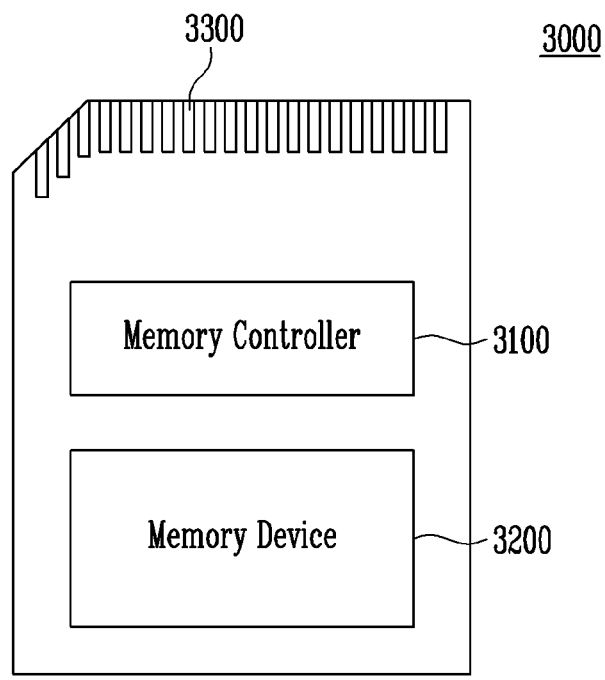
FIG. 14 is a diagram illustrating a memory card system in accordance with an embodiment of the present disclosure.

FIG. 14 is a diagram illustrating a memory card system 3000 in accordance with an embodiment of the present disclosure.

Referring to FIG. 14, the memory card system 3000 includes a memory controller 3100, a memory device 3200, and a connector 3300.

The memory controller 3100 may be connected to the memory device 3200. The memory controller 3100 may access the memory device 3200. For example, the memory controller 3100 may control read, write, erase, and background operations on the memory device 3200. The memory controller 3100 may provide an interface between the memory device 3200 and a host (not shown). Also, the memory controller 3100 may drive firmware for controlling the memory device 3200.

For example, the memory controller 3100 may include components such as a Random Access Memory (RAM), a processing unit, a host interface, a memory interface, and an error corrector.

The memory controller 3100 may communicate with an external device (e.g., the host) through the connector 3300. The memory controller 3100 may communicate with the external device according to a specific communication protocol. Exemplarily, the memory controller 3100 may communicate with the external device using at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

Exemplarily, the memory device 3200 may be implemented with any of various nonvolatile memory devices such as an Electrically Erasable and Programmable ROM (EEPROM), a NAND flash memory, a NOR flash memory, a Phase-change RAM (PRAM), a Resistive RAM (Re-RAM), a Ferroelectric RAM (FRAM), and a Spin Torque Transfer magnetic RAM (STT-MRAM).

The memory controller 3100 and the memory device 3200 may be integrated into a single semiconductor device to constitute a memory card. For example, the memory controller 3100 and the memory device 3200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), a Universal Flash Storage (UFS), or the like.

Figure 15:
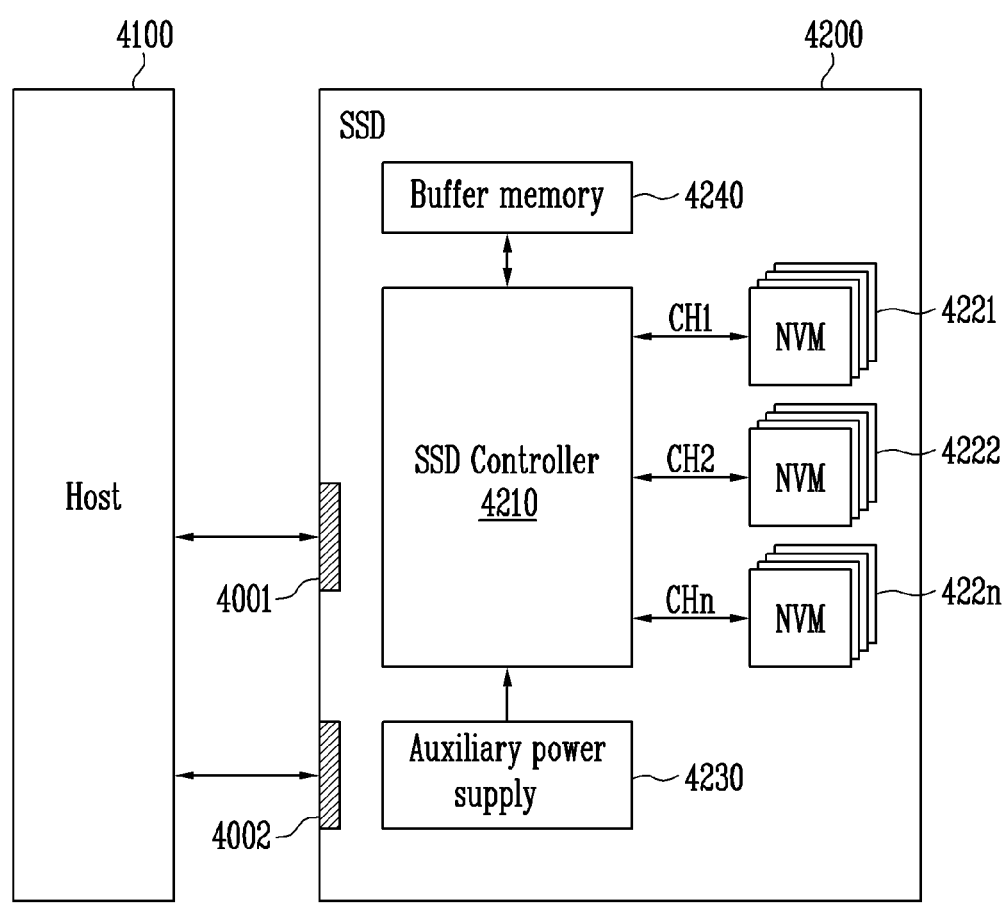
FIG. 15 is a diagram illustrating a Solid State Drive (SSD) in accordance with an embodiment of the present disclosure.

FIG. 15 is a diagram illustrating a Solid State Drive (SSD) system 4000 in accordance with an embodiment of the present disclosure.

Referring to FIG. 15, the SSD system 4000 includes a host 4100 and an SSD 4200. The SSD 4200 exchanges a signal SIG with the host 4100 through a signal connector 4001, and receives power PWR from the host 4100 through a power connector 4002. The SSD 4200 includes an SSD controller 4210, a plurality of flash memories 4221 to 422n, an auxiliary power supply 4230, and a buffer memory 4240.

In an embodiment, the SSD controller 4210 may serve as the memory controller 200 described with reference to FIG. 1. The SSD controller 4210 may control the plurality of flash memories 4221 to 422n in response to a signal SIG received from the host 4100. Exemplarily, the signal SIG may be a signal based on an interface between the host 4100 and the SSD 4200. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 4230 may be connected to the host 4100 through the power connector 4002. The auxiliary power supply 4230 may receive power PWR input from the host 4100 and be charged by the power PWR. When the supply of power from the host 4100 is not smooth, the auxiliary power supply 4230 may provide power to the SSD 4200. Exemplarily, the auxiliary power supply 4230 may be located in the SSD 4200, or be located at the outside of the SSD 4200. For example, the auxiliary power supply 4230 may be located on a main board, and provide auxiliary power to the SSD 4200.

The buffer memory 4240 may operate as a buffer memory of the SSD 4200. For example, the buffer memory 4240 may temporarily store data received from the host 4100 or data received from the plurality of flash memories 4221 to 422n, or temporarily store meta data (e.g., a mapping table) of the flash memories 4221 to 422n. The buffer memory 4240 may include any of volatile memories such as a DRAM, an SDRAM, a DDR SDRAM, an LPDDR SDRAM, and a GRAM or any of nonvolatile memories such as an FRAM, a ReRAM, an STT-MRAM, and a PRAM.

Figure 16:
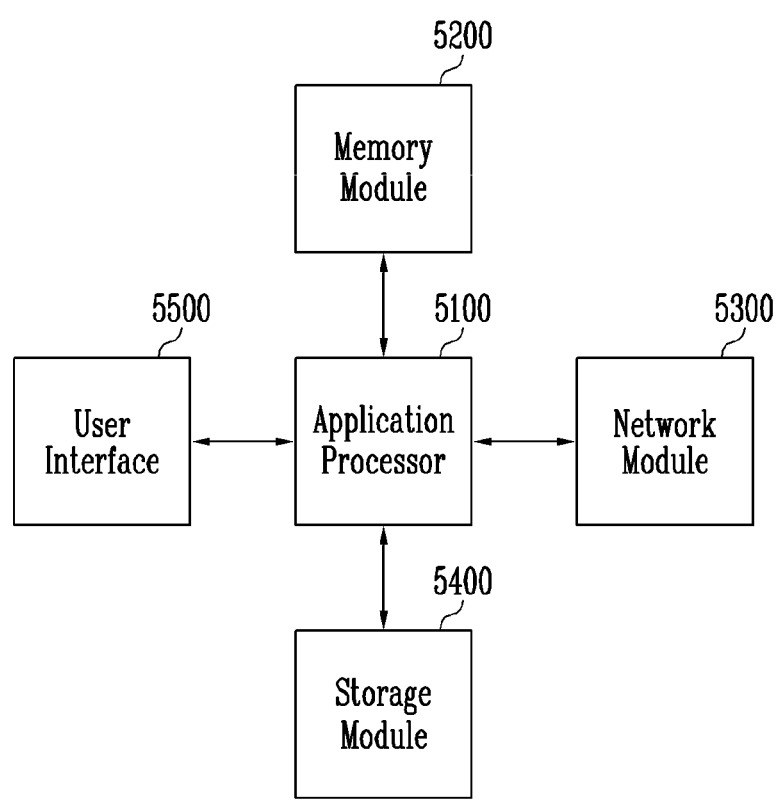
FIG. 16 is a diagram illustrating a user system in accordance with an embodiment of the present disclosure.

FIG. 16 is a diagram illustrating a user system 5000 in accordance with an embodiment of the present disclosure.

Referring to FIG. 16, the user system 5000 includes an application processor 5100, a memory module 5200, a network module 5300, a storage module 5400, and a user interface 5500.

The application processor 5100 may drive components included in the user system 5000, an operating system (OS), a user program, or the like. Exemplarily, the application processor 5100 may include controllers for controlling components included in the user system 5000, interfaces, a graphic engine, and the like. The application processor 5100 may be provided as a System-on-Chip (SoC).

The memory module 5200 may operate as a main memory, a working memory, a buffer memory, or a cache memory of the user system 5000. The memory module 5200 may include any of volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or any of nonvolatile random access memories such as a PRAM, a ReRAM, an MRAM, and a FRAM. Exemplarily, the application processor 5100 and the memory module 5200 may be provided as one semiconductor package by being packaged based on a Package on Package (PoP).

The network module 5300 may communicate with external devices. Exemplarily, the network module 5300 may support any of wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In another embodiment, the network module 5300 may be included in the application processor 5100.

The storage module 5400 may store data. For example, the storage module 5400 may store data received from the application processor 5100. Alternatively, the storage module 5400 may transmit data stored therein to the application processor 5100. Exemplarily, the storage module 5400 may be implemented with a nonvolatile memory device such as a Phase-change RAM (PRAM), a Magnetic RAM (MRAM), a Resistive RAM (RRAM), a NAND flash, a NOR flash, a NAND flash having a three-dimensional structure, or the like. Exemplarily, the storage module 5400 may be provided as a removable drive such as a memory card of the user system 5000 or an external drive.

Exemplarily, the storage module 5400 may include a plurality of nonvolatile memory devices, and the plurality of nonvolatile memory devices may operate identically to the memory device described with reference to FIGS. 1 to 14. The storage module 5400 may operate identically to the storage device 1000 described with reference to FIG. 1.

The user interface 5500 may include interfaces for inputting data or commands to the application processor 5100 or outputting data to an external device. Exemplarily, the user interface 5500 may include one or more of user input interfaces such as a keyboard, a keypad, a button, a touch panel, a touch screen, a touch pad, a touch ball, a camera, a microphone, a gyroscope sensor, a vibration sensor, a piezoelectric element, and so on. The user interface 5500 may further include one or more of user output interfaces such as a Liquid Crystal Display (LCD), an Organic Light Emitting Diode (OLED) display device, an Active Matrix OLED (AMOLED) display device, an LED, a speaker, a monitor, and so on.

In accordance with the embodiments of the present disclosure, there can be provided an improved operating method of a storage device using a buffer memory with a minimum capacity.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A storage device, comprising:
   a memory device including a plurality of memory blocks and a map data block including mapping information between a logical address and a physical address;
   a buffer memory device configured to store a block state table including block state information, the block state information including a map segment to which a logical address of data stored in each of the plurality of memory blocks belongs; and
   a memory controller configured to determine valid data of a source block among the plurality of memory blocks based on mapping information corresponding to the source block and block state information corresponding to the source block, and move the valid data to an open memory block in which no data is stored, wherein the memory controller generates a valid page list in which information of the valid data is arranged in a stripe page unit according to an order of logical addresses, and controls the memory device to move the valid data to the open memory block based on the valid page list, the valid page list being generated using the block state information and the mapping information for the plurality of memory blocks, and wherein the stripe page unit corresponds to a set of pages having a same page row among pages included in a plurality of dies of the memory device.

2. The storage device of claim 1, wherein the memory controller sequentially moves the valid data according to an order of logical addresses of pages included in the plurality of dies, based on the valid page list.

3. The storage device of claim 1, wherein the block state table includes a plurality of map segments for each of the plurality of memory blocks, and each of the plurality of map segments corresponds to a plurality of logical addresses.

4. The storage device of claim 3, wherein, when write data is stored in the memory device, the memory controller controls the buffer memory device to store, as a set state, a bit representing a map segment corresponding to a logical address of the write data, the bit being included in the block state information.

5. The storage device of claim 3, wherein, when one of the plurality of memory blocks is erased, the memory controller controls the buffer memory device to store, as a clear state, bits representing map segments corresponding to the one block, the bits being included in the block state information.

6. The storage device of claim 1, wherein the memory controller:
   determines, a valid data address, a logical address corresponding to a physical address of the source block among logical addresses corresponding to the map segment; and
   determines, as the valid data, data corresponding to the valid data address.

7. The storage device of claim 6, wherein the buffer memory device includes information on a number of valid pages included in each of the plurality of memory blocks.

8. The storage device of claim 7, wherein the memory controller determines the source block among the plurality of memory blocks, based on the information on the number of the valid pages.

9. The storage device of claim 8, wherein the source block is a memory block having a smallest number of valid pages among the plurality of memory blocks.

10. The storage device of claim 1, wherein the buffer memory device is a static random access memory.

11. A storage device, comprising:
    a plurality of memory devices commonly connected to one channel, each of the plurality of memory devices including a plurality of memory blocks and a map data block, the map data block storing mapping information between a logical address and a physical address;
    a buffer memory device configured to store a block state table including block state information, the block state information including a map segment to which a logical address of data stored in each of the plurality of memory blocks; and
    a memory controller configured to determine valid data of a source block among the plurality of memory blocks based on mapping information corresponding to the source block and block state information corresponding to the source block, and move the valid data to an open memory block in which no data is stored,
    wherein the memory controller generates a valid page list in which information of valid data is arranged in a stripe page unit according to an order of logical addresses, and controls the plurality of memory devices to move the valid data to open memory blocks, based on the valid page list, the valid page list being generated using the block state information and the mapping information for the plurality of memory blocks in each of the plurality of memory devices, and
    wherein the stripe page unit corresponds to a set of pages having a same page row among pages included in the plurality of memory devices.

12. The storage device of claim 11, wherein the memory controller sequentially moves the valid data according to an order of logical addresses of pages included in the plurality of memory devices, based on the valid page list.

13. The storage device of claim 11, wherein the block state table includes a plurality of map segments for each of the plurality of memory blocks, and each of the plurality of map segments corresponds to a plurality of logical addresses.

14. The storage device of claim 13, wherein, when write data is stored in at least one of the plurality of memory devices, the memory controller controls the buffer memory device to store, as a set state, a bit representing a map segment corresponding to a logical address of the write data, the bit being included in the block state information.

15. The storage device of claim 13, wherein, when one of the plurality of memory blocks is erased, the memory controller controls the buffer memory device to store, as a clear state, bits representing map segments corresponding to the one block, the bits being included in the block state information.

16. The storage device of claim 11, wherein the memory controller:
    determines, a valid data address, a logical address corresponding to a physical address of the source block among logical addresses corresponding to the map segment; and
    determines, as the valid data, data corresponding to the valid data address.

17. The storage device of claim 16, wherein the buffer memory device includes information on a number of valid pages included in each of the plurality of memory blocks.

18. The storage device of claim 17, wherein the buffer memory device is a static random access memory.

* * * * *